Dec. 10, 1968            J. R. TOTH            3,416,055
BRUSHLESS ELECTRIC MOTOR CIRCUITRY
Filed May 31, 1966            2 Sheets-Sheet 1
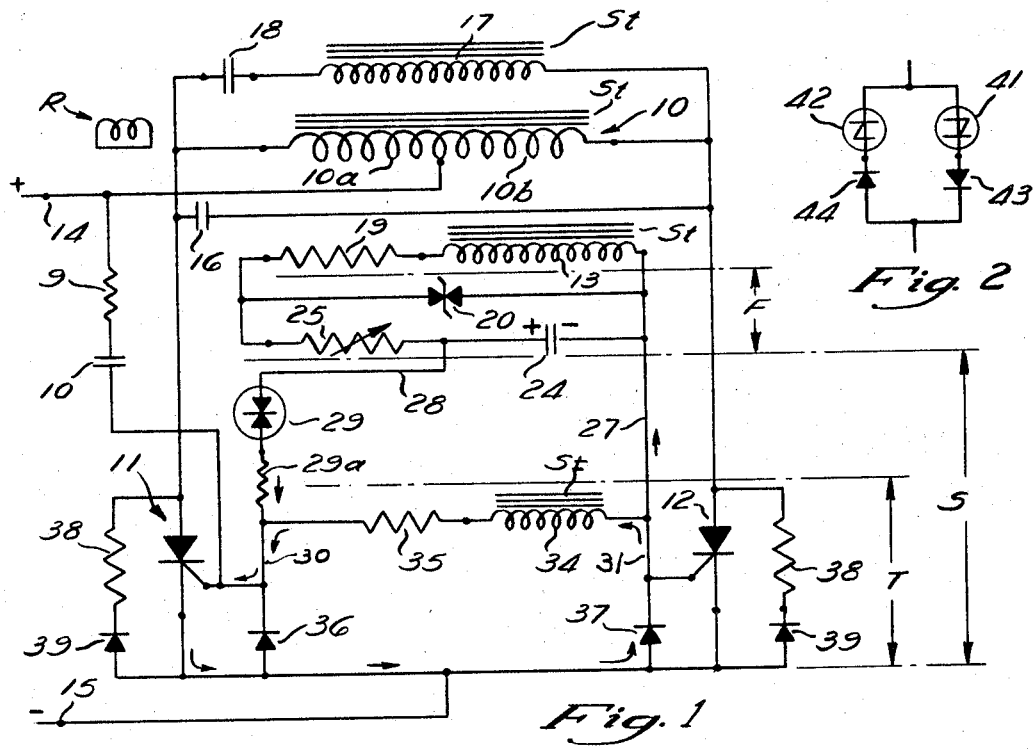
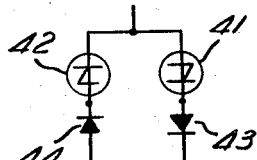
Fig. 2
Fig. 1
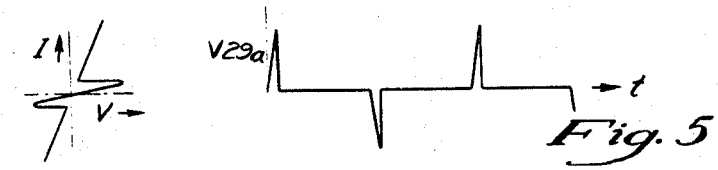
Fig. 4
Fig. 5
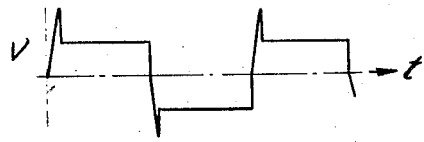
Fig. 6
INVENTOR.
J. ROGER TOTH
BY Ely & Golrick
ATTORNEYS

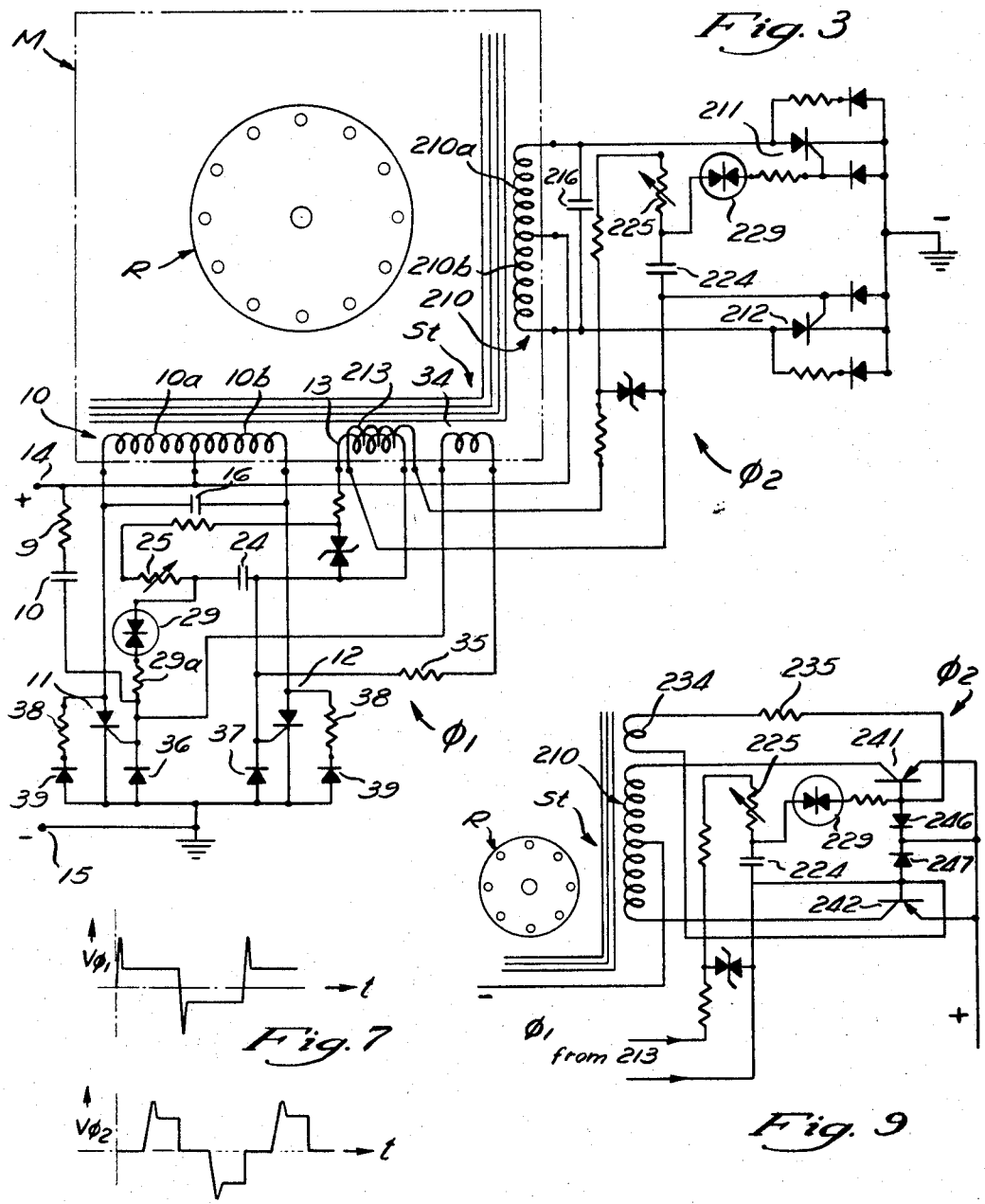

_United States Patent Office_

3,416,055
Patented Dec. 10, 1968

---

3,416,055
BRUSHLESS ELECTRIC MOTOR CIRCUITRY
J. Roger Toth, Macedonia, Ohio, assignor to Ametek, Inc., a corporation of Delaware
Filed May 31, 1966, Ser. No. 559,646
16 Claims. (Cl. 318—138)

The present invention relates primarily to a so-called brushless direct current electric motor wherein solid state switching devices are used in conjunction with motor stator windings to convert direct current power into a suitable alternating magnetic field resulting in motor operation similar to that of alternating current induction motor, for example; and more particularly to circuitry assuring properly timed and improved solid state device switching action, especially firing of silicon controlled rectifiers as such devices, with maintenance of the switching devices in on condition for the desired period.

The prior art, as represented by patents, publications and commercial operations, has already proposed a wide variety of motors adapted for operation by direct current sources without need of mechanical commutating structure by virtue of circuitry, including electronic switching devices and windings on the motor stator comprising the main stator or field windings and feedback winding means on the stator, which produces an alternating magnetic field, whereby a suitable rotor, of some structure similar to prior alternating current motors, is driven similarly to an induction motor or other motor usually energized from an alternating current source. However to confer a "universal" character, that is, operability from either A.C. or D.C. sources, at times there has further been included in the motor package suitable power rectifying means. Motors of the type under discussion have assumed increasing commercial importance because of the elimination therein of certain undesirable or unreliable characteristics of mechanically commutated motors.

Since in many motors of this type silicon controlled rectifiers are deemed particularly advantageous, in contrast with vacuum tubes or even other solid state devices such as power transistors, to serve as electronic switching means cooperating with main stator windings and feedback wings to provide the direct current energized circuitry affording the alternating magnetic field required, the invention will be hereinafter first described for motors with silicon controlled rectifiers, it being understood that the invention has useful aspects for motor circuitry using other switching devices such as transistors.

By the present invention in motors of the character described, there is offered novel circuitry for providing suitably timed and shaped pulses initiating conduction by the electronic switch and for further assuring conditions for maintaining the device conducting at its appropriate time. In general terms the present invention contemplates, in addition to a timing circuit branch often associated with a feedback winding, the use of a solid state bi-directional or bilateral trigger switch device to provide effectively shaped and timed control pulses to each switch device, in conjunction with a further "auxiliary" trickle feedback circuit branch providing a better control pulse wave form, especially useful when connected to the SCR gates to insure maintenance of a fired SCR in conducting state for its appropriate period despite certain conditions arising in the circuitry of this type of motor where a SCR would tend to go out of conduction prematurely as a result of the inductive character of the circuit load. Further the invention may be applied in either single or multiphase wound motors. It has further been observed that poor SCR gating signals, as are frequently found in this general type of motor, tend to cause shortened life of the SCR's. By the present invention there is advantageously afforded motor circuitry avoiding these difficulties which have so often appeared in circuitry using SCR's for the present purposes.

It is the general object of the present invention to provide an improved type of circuitry for a brushless D.C. motor utilizing electronic solid state switching devices in conjunction with the main stator windings and feedback windings on the stator to afford an alternating magnetic field in the stator. A further object is the provision of improved circuitry for an electric motor of the character described affording improved operation of the SCR's. A still further object is to provide firing circuitry supplying firing pulses of improved shape to the gates of the SCR's. Another object of the invention is to provide in a motor of the character described circuitry including an auxiliary feedback winding affording relatively inexpensive and positive means for assuring maintenance of each SCR in its proper fired condition for requisite periods. Other objects and advantages of the present invention will appear from the following description and the drawings wherein:

FIG. 1 is a schematic drawing of one embodiment of the invention in circuitry for a single phase wound motor;

FIG. 2 is a fragmentary schematic of alternate means providing a bilateral or bi-directional trigger switch;

FIG. 3 is a schematic drawing of an embodiment of the invention in a two phase type motor;

FIG. 4 is a bilateral trigger switch response curve;

FIG. 5 is a generalized diagram of switching circuit output;

FIG. 6 diagrammatically shows the composite gate signals for FIG. 1 circuitry;

FIGS. 7–8 diagrammatically show the gating pulses for the two phases respectively of FIG. 3 circuitry; and FIG. 9 is a partial schematic drawing, indicating the application of the invention where transistors are used as the switching devices.

The electric motor circuitry of the present invention, one embodiment of which is represented in FIG. 1, in common with known motors of this type includes a divided main motor stator winding 10, solid state electronic switching devices 11, 12 here both type C35D SCR's, and a main feedback winding 13 of the stator St, as the primary components of oscillator type switching or inverter circuitry, whereby direct current power supplied through the positive and negative main motor leads 14, 15 is switched alternately through the two halves 10a, 10b of the main winding, producing consequently an alternating stator magnetic field for driving a suitable motor rotor R, for example, a rotor of an induction motor type in accordance with known operating principles; pulses for the alternate firing of the SCR's being derived ultimately from the feedback winding 13. For operation of the oscillator circuitry, as such, rotor rotation is not necessary. What may be termed a starting trigger branch is connected from the positive input lead to the gate of a selected one SCR, here a resistor 9 and capacitor 10 in series between 14 and the gate of 11, whereby a transient pulse arising upon initial application of D.C. power at 14, 15 as by closure of a switch controlling the D.C. source causes that one SCR first to turn on. Commutating capacitor 16 is connected across the ends of winding 10, i.e., to the SCR anodes.

There is also shown a starting circuit branch in parallel with and across the extreme ends of the main feedback winding, comprised of the starting winding 17 physically displaced on the stator from main winding 10 in series with the starting capacitor 18 to afford a phase displacement of the magnetic field produced in 17 as used for starting purposes in a single phase induction motor. In series with the main feedback coil 13 there is shown a resistor 19 which may represent the resistance inherent in the coil itself or a physically separate resistor used to adapt the relative parameters of the circuitry for optimum operation. The back-to-back Zener diode device 20 shown in parallel across the main feedback winding-resistor branch, though not generally necessary, is often advantageous as a feedback pulse shaping device.

Delimited between four horizontal dashed lines in the schematic diagram are three circuit sections particularly pertinent to the present invention though other parts of the circuitry may be accommodated for cooperation therewith, namely, the firing pulse timing circuit, section F, the trigger switch section S and the trickle or "keep alive" feedback section T.

The pulse timing circuit section F essentially comprises and R–C branch in parallel across the feedback winding 13 and its resistor 19 including the timing and storage capacitor 24 in series with the resistor 25, the latter preferably adjustable for varying the R–C constant or timing constant, and thereby the oscillation frequency and ultimately motor speed, to some degree. The Zener device 20 can also be considered as a component of this circuit. The feedback pulses usually at least roughly approximating square wave form in this type of circuit, and arising at the feedback coil, are applied as an input to the pulse timing circuit F, providing at lines 27, 28 from opposite sides of capacitor 24 timed partially shaped pulses applied as an input to the trigger switch circuit branch S.

The trigger circuit branch comprises the bi-directed switch 29, for example, a Texas Instrument bilateral PNPN solid state trigger switch TI 43, interposed between lines 28 and 30; the finally shaped output pulses of which are applied through line 30 and line 31 from line 27 respectively to the gates of SCR's 11, 12. (If desired a resistor 29a may be included in the branch S in series with the switch device 29a.)

The auxiliary trickle or "keep-alive" feedback section T is comprised of another feedback winding 34 wound onto the stator and connected between the SCR gates, i.e., to input lines 30, 31, in series with resistor 35 as may be desired or required for adjustment of circuit parameters for optimum operation.

Further required are the two similar blocking diodes 36, 37 such as IN4001 diodes respectively connected with the polarity indicated between gate and cathode for SCR's 11, 12 respectively, which here also serve as portions of the firing pulse path for the cooperating circuits F, S and also in conjunction with the trickle branch T. Also between the anode and cathode of each SCR there are connected in series a resistor 38 and a protective diode 39.

Though the two feedback coils are conveniently wound in generally parallel relation in the same slots as main winding 10, they need not be, usually are not, of the same number of turns. The starting winding 17 is, of course, physically angularly spaced on the stator core from the main winding 10.

In FIG. 2 is shown an alternate provision for a bilateral switch or trigger means which as a whole could be considered as equivalent to the device 29 in FIG. 1, being comprised of two parallel branches each including a single-directed solid state switch 41, 42 (Texas Instrument, TI42), in series with a respective blocking diode 43, 44, the opposite polarity connection of the diodes to their switches permitting each branch to conduct in only one direction as opposed to the other.

A typical example of a motor wherein such circuitry is applied with components as above described is a ⅓ H.P. motor, nominal 100 volts D.C. supply required, with a nominal speed of 12,000 r.p.m. operated at an oscillator frequency of 300–400 cycles per second as determined by the resistance actually applied at the variable resistor 25 in the resonant feedback circuit, with the trickle feedback coil 34 wound physically parallel, that is, into the same stator slots with a standard feedback winding 13 for a motor of this type, though having only a fraction of the number of turns used in 13

The trickler feedback winding for example, affords a current of about 30 milliamperes at 3 volts (without the resistor R 35) which with a suitable resistor 35 could be 10–15 ma.; with on the other hand the main feedback winding itself providing output pulses at 10 volts.

FIG. 3 schematically represents the invention as applied to a so-called two-phase brushless direct current motor. Here R again represents an induction motor type rotor or the like rotor, such as a squirrel cage rotor; Rt, the stator with again a laminated iron stack or core; the further components or elements of circuitry similar to those previously described in FIG. 1 being designated by corresponding reference numerals. At the bottom of the diagram, the circuitry provided for one phase of the motor is essentially identical with that shown in FIG. 1.

At the right side of the drawing the circuitry configuration for a second phase is also generally similar to that of FIG. 1 or of the bottom of FIG. 3. Here the motor includes the second phase main stator winding 210 physically spaced 90 electrical degrees from the main winding 10; a second phase feedback coil 213 associated however, not with the main phase winding 210, but rather with first phase winding 10, and being conveniently wound as a bi-filar winding with feedback winding 13; a firing circuit; and the specific pulse shaping and switching circuitry. There is lacking, however, the auxiliary or "keep-alive" tickler feedback circuit as represented at 34 in FIG. 3 associated with the first phase, as this is not here needed in the second phase circuitry.

The windings 13, 34 and 213, being thus all physically associated with the first phase main winding, may be wound upon, or into the same slots as, winding 10, space in a particular motor so permitting.

Advantageously the FIG. 3 circuit simply can provide also for phase-locking, i.e., establishing a definite sequence of SCR firing to ensure that the motor will always start and operate in the same selected direction for which the feedback windings are connected as to polarities. For this purpose the R–C constants are appropriately selected in the two phases, not only for the required oscillator frequency, corresponding to desired motor speed, but also relative to each other, so that with feedback signals developed in-phase in 13 and 213, the effective switching pulse outputs from the trigger switching section of each phase will be 90° apart. This is attained, for example, with the same timing capacitor values in the two phases, merely by use of appropriately different resistance values in the two timing sections, as hereinafter discussed.

Considering no wthe operation of the FIG. 1 motor in stable state, assuming SCR 12 to be on with SCR 11 off or blocking, an approximately square voltage pulse arising at feedback coil 13 with the polarities indicated (by virtue of transformer action of rising current in 10b) and applied across the R–C network causes nearly linear charging of the timing and storage capacitor 24 with the polarity shown resulting in a linear positive-going pulse applied to 29; the Zener device 20 initially aiding this shaping by holding the input to the R–C network toward square shape. Now as the solid state PNPN type bilateral trigger element has an I-V response curve of the shape indicated roughly in FIG. 4, when the charge across 24 reaches the breakover voltage of 29, capacitor 24 discharges rapidly through the gate-cathode circuit applying a narrow sharply peaked positively-going pulse (See FIG. 5) to the gate of SCR 11 by the pathway through device 29, resistor 29a if used, the gate and cathode of SCR 11, and the diode 37, connected back to line 27. Thus a fast rising gate pulse of short duration, sharply peaked, is applied to the gate of SCR 11 to turn the same on. Also, as the commutating capacitor 16 by virtue of auto-transformer action in winding 10 is charged toward twice the supply voltage while 12 is conducting, upon firing of SCR 11 it applies a reverse bias across the anode-cathode of SCR 12 to turn off the latter. This capacitor then discharges and in similar manner charges in opposite sense while SCR 11 is on.

This gating pulse is of short duration and, because of the inductive components in the circuit, there tends to arise also a reverse swing or bias applied to the anode of the newly turned on SCR 11 tending to turn it off; but an approximately square feedback pulse and current, arising—by transformer action from increasing current in 10a—at auxiliary feedback coil 34 before the last mentioned reverse biasing potential is effective, is now applied to the gate of SCR 11 as soon as it is turned on, through the pathway provided from the feedback coil 34, from gate to cathode in SCR 11, the common cathode or ground line and diode 37 back to the auxiliary feedback branch. This, for the half-cycle of operation during which SCR 11 is to be maintained turned on, affords a trickle current which being already present at the time the gate potential and current might start to drop maintains a positive current to the gate with the passing of the short initial trigger switching pulse.

FIG. 6 diagrammatically indicates the composite gate signal for the SCR 11 above the time axis (and also for SCR 12 below that axis) resulting from the combination of the output of the bilateral trigger switching circuitry with that of the trickle load feedback circuit which, it is seen, maintains a positive pulse on the gate (i.e., across gate cathode) of SCR 11 beyond the time when the output pulse of the switching circuitry would have passed, so that despite the inductive character of the load to SCR does not turn off.

Consequent upon SCR 11 turning on, with rising current in 10a, of course, a square wave pulse is produced at 13 with polarity now reversed, thereby to charge capacitor 24 in a similar manner but in opposite sense to that previously described until the breakover voltage of 29 is reached in opposite direction. Hence the next pulse provided as an output of the trigger switching circuit, reversed in polarity to the proceeding, appears as a positive gate pulse to turn on SCR 12, following an analogous path from capacitor 24, gate-cathode of 12, diode 36 and bilateral trigger 29 back to capacitor 24. The next trickle load pulse accordingly is reversed in polarity, since produced by current in 10b, and passes through the gate-cathode of 12, diode 26 and back to the winding 34, again to maintain SCR 12 turned on by the resulting composite pulse indicated below the time line on FIG. 5, SCR 11 being turned off as 12 comes into conducting state by the action of commutating capacitor 16. To be emphasized for understanding of operation of the FIG. 1 circuitry and also of the subsequently described two-phase motor circuitry, is the fact that after a break-over voltage of 29 is reached and discharge of 24 to produce a gating pulse turning on one SCR, the main winding portion thereupon energized by transformer action produces an output in 13 with polarity immediately starting charging of capacitor 24 in reversed sense.

Thus by the action of diodes 36, 37 and element 29 the composite output of circuits S and T is appropriately applied alternatingly to the gates of SCR's 11, 12 with the alternating polarity of the equi-spaced pulses. It is to be understood that these FIGS. 4–6 (as also the FIGS. 7–8 hereinafter mentioned) are diagrammatic only of the general relations of magnitude and sequence among the occurring pulses.

The frequency of oscillation, therefore intended motor speed, is thus dependent upon the time constant of the timing circuit, in other words for a given winding 13 dependent on the total resistance of 19 and 25 in series with capacitor 24 and the value of the latter; the adjustability of 25 affording some frequency and speed adjustment range.

The energization of coil 17 out of phase with the main winding because of the presence of the starting capacitor 18 produces a rotating field and hence torque at starting in the usual manner known in single phase alternating current motor employing this type of starting winding arrangement.

In the operation of a motor as represented in FIG. 3, the inverter operation of the phase 1 circuitry $\phi_1$ considered per se is basically that as above described in FIG. 1, with the resistance and capacitance values in the timing circuit selected for an R–C constant appropriate to the motor speed required, the gating signals being represented by FIG. 7. The variable resistor 225 is used to accommodate the R–C constant of $\phi_2$ to changes made at 25 in phase 1 in selecting or changing speed.

Since the phase 2 feedback winding is wound physically parallel to phase 1 feedback winding 13, conveniently bifilar, the pulses applied to their corresponding timing circuits are in phase (or 180° out of phase, depending upon how the leads are viewed as to polarity). In any event with the time-constant selected so that upon application of supply voltage with a resultant transient causing one of the SCRs to fire in phase 1, SCR 11 with the branch provided by 9–10 as shown, and the simultaneous pulses thereupon generated in 13 and 213 starting the charging of the respective timing capacitors, the capacitor in $\phi_2$ first reaches the breakover voltage of 229 to cause a firing of say 211 at a point of time one-half the time required for 24 to reach the breakover voltage of 29, as indicated by FIG. 8 relative to FIG. 7, in other words with the firing of 211 lagging by 90° the firing of 11 in phase 1. The firing of 211, which, of course, stays turned on, does not affect the time of firing for SCR 212, since the charging of 224 is produced by transformer action of the first phase main winding upon the winding 213; but rather when SCR 12 is turned on in the independently proceeding in verter action in phase 1, the feedback pulses generated with now reversed polarity in 13 and 213 again start the charging of 24 and 224 in opposite sense with 224 reaching the breakover voltage of 229 later than the firing of 12 by 90 degrees, to turn on 212, with 211 turning off; the commutating capacitor in the second phase however, providing the reverse biasing alternately to the second phase SCRs. Moreover, since the polarity of the charging of timing capacitor 224 in $\phi_2$ is determined not by the turned-on condition of an SCR in $\phi_2$, for example, 211 having been turned on by 224 reaching breakover of voltage of 229 90° after and because of SCR 11 turned on in $\phi_1$, and the polarity of signal from 213 continuing (for the remaining 90° of time in which 11 is turned on) in the same sense as caused 224 to charge to the point resulting in turning on 211, there continues to be applied to the gate of the SCR 211 turned on in $\phi_2$ a signal from 213, which provides for the second phase circuitry the effect of the trickle signal provided by the coil 34 to an SCR turned on in the first phase; and of course, a similar action for SCR 212 when it is turned on subsequently to SCR 12 in the first phase.

The inverter action thus proceeds in the two phases, producing magnetic fluxes 90 degrees out of phase so that a rotating field is present in the stator even to start the motor rotation. Changing of direction of motor operation is, of course, simply achieved by reversing the lead connections of feedback winding 213.

The above described circuitry may advantageously be used with corresponding modifications where say power transistors are used as the solid state switching devices; and in FIG. 9 a partial schematic diagram represents the circuitry for the second phase of a two phase type motor using power transistors for the two phases. In such a motor, in addition to the stator windings 10 and 12, 213 and 34 associated on the stator with winding 10 of the first phase and 210 for the second phase as in FIG. 3, there is included in the FIG. 9 modification an additional auxiliary trickle or "keep-alive" feedback winding 234 associated with the second phase main winding 210 on the stator and having a resistor 235 in series therewith. In both phases the transistors are connected as indicated in FIG. 9 for the PNP power transistors 241, 242 with the collector-emitter electrode pair of each connected in series with a respective half of the main winding 210 across the D.C. power leads; and for the common emitter configurations shown, the base of each serving as a control electrode with the emitter as the electrodes through which the timing and trickle signals are applied; the diodes 246, 247 being here connected with anodes to respective transistor bases and cathodes jointly with both emitters to the positive power lead. Basically the operation of a transistorized motor as represented in FIG. 9 is similar to that described for FIG. 3, with substantially a 90° time delay of the effect in $\phi_2$ of timing signals derived from $\phi_1$; but the winding 213 ensures a "keep-alive" trickle signal for a conducting transistor in $\phi_2$, say 241, for the 90° time in the second phase cycle after the transistor in $\phi_2$, say 11 (the conduction of which gave rise to turning 241), ceases to conduct to any substantial degree.

I claim:

1. In a brushless direct current motor comprising a stator having a main winding divided in two halves wound generally parallel on the stator core, an induction motor type rotor, each half of the main winding similarly connected in series with the anode and cathode of a respective silicon controlled rectifier across direct current input leads of the motor with the cathodes toward the negative lead, commutating capacitor means between the anodes, and gating circuitry including a feedback winding on the stator core associated with the main winding providing pulses for application alternately to the gates of said silicon controlled rectifiers, an improved said circuitry comprising: a resistor-capacitor timing branch connected across said feedback winding to provide timed pulses as an input to a switching circuit; the last said circuit including a solid state bilateral trigger switch and output leads connected to the gate of a respective one of the silicon controlled rectifiers and through a diode to the cathode of the other silicon controlled rectifier, the diode anodes and said cathods commonly connected, whereby successive pulses of alternating polarity from said feedback winding result in sharply peaked successive gating pulses alternately applied to said silicon controlled rectifiers.

2. In a motor as described in claim 1, said circuitry including an auxiliary feedback circuit including an auxiliary feedback winding associated on the stator core with the first said feedback winding, the last said circuit having output leads connected respectively to the gates of said silicon controlled rectifiers and therewith to the cathode of a respective diode, whereby a square wave pulse arising in the auxiliary winding upon firing of either rectifier is applied to the gate of the fired rectifier to maintain the same in conducting states through any reverse anode bias arising from the inductive character of the anode-cathode circuit.

3. In a motor as described in claim 1, said circuitry including Zener diode means across the output of the first said feedback winding to aid shaping toward a square wave output.

4. A motor and circuitry as described in claim 1, having a starting circuit connected between the anodes of said rectifiers and including a starting winding on said core angularly displaced from said main winding and means providing a current phase shift relative to said main winding, thereby adapted to develope starting torque.

5. In a motor as described in claim 1, said timing branch including a variable resistor to vary the frequency of inverter operation and thereby motor speed.

6. A motor and circuitry as described in claim 1, including a second divided main winding as a second phase winding on the stator core displaced angularly from the first said main winding as a first phase, a pair of silicon controlled rectifiers for the second phase winding, a commutating capacitor, a second phase feedback winding wound on the stator in associated with the first phase winding for energization by the first phase main winding, a resistance-capacitance timing branch, a switching circuit and diodes connected as in the first phase circuitry; the R–C constant of the second phase timing branch being half that of the first phase timing branch to provide phase-locking between the circuitry of the two phases adapting the motor to develope starting torque in a polyphase induction motor mode of operation.

7. A motor as described in claim 6, the first phase circuitry including an auxiliary feedback circuit including an auxiliary feedback winding associated on the stator core with the first said feedback winding, the last said circuit having output leads connected respectively to the gates of said silicon controlled rectifiers and therewith to the cathode of a respective diode, whereby a square wave pulse arising in the auxiliary winding upon firing of either rectifier is applied to the gate of the fired rectifier to maintain the same in conducting states through any reverse anode bias arising from the inductive character of the anode-cathode circuit.

8. A motor as described in claim 6 including Zener diode means across the feedback windings providing inputs to the time branches.

9. A brushless direct current motor comprising a stator having a main winding divided in two halves wound generally parallel on the stator core, an induction motor type rotor, each half of the main winding similarly connected in series with the anode and cathode of a respective silicon controlled rectifier across direct current input leads of the motor with the cathodes toward the negative lead, commutating capacitor means between the anodes of said rectifiers, and gating circuitry including a feedback winding on the stator core associated with the main winding providing pulses for application alternately to the gates of said silicon controlled rectifiers forming inverter circuitry whereby said main winding developes an alternating magnetic field in said stator core; said gating circuitry including a resistor-capacitor timing branch connected across said feedback winding, solid state bilateral trigger switch and diode means for applying opposite alternate charges from the timing branch capacitor alternately to the gates of the respective silicon controlled rectifiers as sharply peaked gating pulses; and trickle current circuit means for maintaining each said rectifier conducting until turned off by said commutating capacitor upon the other being turned on and including a trickle winding on stator core associated with said feedback winding and diode means, whereby a trickle current is supplied to the gate of each rectifier when turned on.

10. A motor as described in claim 9, wherein the described circuitry serves as first phase inverter circuitry for said main winding as a first phase main winding, and including a second phase inverter circuitry like to the said first phase inverter circuitry, the main winding of the second phase circuitry spaced on the core in electrical angular sense from the first phase main winding, the feedback winding of the second phase circuitry associated on the core with the first phase main winding; the R–C constant of the second phase timing branch being half that of the first phase timing branch to provide phase-locking between the circuitry of the two phases adapting the motor to develope starting torque in an intended direction for a polyphase induction motor mode of operation.

11. A motor as described in claim 10 wherein said feedback windings are wound bifilar on the core.

12. A brushless direct current current motor comprising: an induction motor type rotor; a stator having a main winding divided in two halves wound generally parallel on the stator core; a pair of solid state switching devices each comprising two electrodes connected with a respective half of the main winding in series across direct current input leads of the motor and each having a third electrode serving as a control electrode in conjunction with a first of said two electrodes; and switching control circuitry for said devices including a feedback winding on the stator core associated with the main winding providing pulses for application alternately to the control electrodes of said devices, whereby direct current input alternatingly energizes said winding halves to develop an alternating magnetic flux in said stator; said circuitry comprising a resistor-capacitor timing branch connected across said feedback winding to provide timed pulses as an input to a switching circuit; the last said circuit including a solid state bilateral trigger switch and output leads each connected to the control electrode of a respective one of the said devices and through means shunting the respective one device to the said first electrode of the other device, said first electrodes commonly connected, whereby successive pulses of alternating polarity from said feedback winding result in sharply peaked successive control pulses alternately applied to said control electrodes; said circuitry further including an auxiliary feedback circuit including an auxiliary feedback winding associated on the stator core with the first said feedback winding, the last said circuit having output leads connected respectively to the control electrodes of said devices, whereby a square wave approximating pulse arising in the auxiliary winding upon either device becoming highly conducting is applied to the control electrode of the highly conducting device to maintain the same in such conducting state through any time of reverse bias arising from the inductive character of the main winding circuit.

13. A motor as described in claim 12, said shunting means comprising diodes thereby providing a lower resistance path past each said device upon occurrence of a control pulse of polarity suitable for rendering the other conducting and said shunting means having a resistance higher than the resistance prevailing between a control electrode and first electrode of a said device for control signal current holding the device in conductive state.

14. A motor as described in claim 13, said solid state switching devices being transistors with bases serving as said control electrodes.

15. A motor as described in claim 14 having a single said main winding and a starting winding displaced angularly therefrom on the core, and a starting capacitor connected in series therewith as a starting circuit across the main winding.

16. A motor as described in claim 13, wherein the said main winding, transistors and switching control circuitry serve as first phase inverter circuitry for producing a first phase alternating magnetic flux in said core by said main winding as a first phase winding; and which includes a second phase inverter circuitry like to the said first phase inverter circuitry, the main winding of the second phase circuitry spaced on the core in electrical angular sense from the first phase main winding, the feedback winding of the second phase circuitry associated on the core with the first phase main winding; the auxiliary feedback winding of the second phase circuitry associated on the core with the second phase main winding; the RC constant of the second phase timing branch being half that of the first phase timing branch to provide phase-locking between the circuitry of the two phases adapting the motor to develop starting torque in an intended direction for a polyphase induction motor mode of operation.

References Cited
UNITED STATES PATENTS

| | | | |
|---|---|---|---|
| 3,083,326 | 3/1963 | Deming et al. | 318—138 |
| 3,175,167 | 3/1965 | Lloyd | 318—138 XV |
| 3,242,406 | 3/1966 | Tanaka | 318—138 |

ORIS L. RADER, *Primary Examiner.*

GLEN SIMMONS, *Assistant Examiner.*

U.S. Cl. X.R.

318—231, 227